United States Patent Office 3,809,536
Patented May 7, 1974

3,809,536
RECIRCULATION BACK TO SOLVENT DYE BATH OF AN AQUEOUSLY SEPARATED HALOHYDRO-CARBON-ALKYLENE GLYCOL ETHER MIXTURE WITH FURTHER HALOHYDROCARBON REMOVING WATER FROM THE ETHER
Frederick L. Sievenpiper, Alden, N.Y., and Elmore L. Bement, Stanley, N.C., assignors to Allied Chemical Corporation, New York, N.Y.
No Drawing. Filed Mar. 30, 1972, Ser. No. 239,753
Int. Cl. D06p 5/00
U.S. Cl. 8—173                      6 Claims

ABSTRACT OF THE DISCLOSURE

A process for recovering organic liquids used in solvent dyeing operations of textiles is described. The organic liquid solvents comprise a water-soluble component and a water insoluble component which, as residual liquors from the solvent dyeing operation contain a small amount of water accumulated during the dye operation from the textile being dyed and form an azeotropic mixture when recovered by distillation. The mixture is recovered as is components by addition of water to separate the water insoluble components, followed by distillation. The water and the water-soluble component also form an azeotrope from which the soluble organic component is recovered by the addition of an entrainer followed by distillation. Both organic components may then be recycled to the solvent dyeing process.

BACKGROUND OF THE INVENTION

The present invention relates to a process for solvent recovery. More particularly, the present invention relates to a process for recovering solvents employed in solvent dyeing operations from azeotropic mixtures thereof.

Recent innovations in dyeing textiles and like materials have included a process known as "solvent dyeing." This process has found much interest in the dyeing industry due to the rapidity of the dyeing operation and short drying time required.

Solvent dyeing is a procedure whereby fibrous materials may be dyed by employing as the dyestuff component, a dyestuff dissolved or dispersed in a liquid comprising a mixture of (1) a volatile, inert, stable, water insoluble, liquid organic compound boiling below about 160° C. and (2) a liquid, water-soluble, organic solvent having a boiling below about 180° C. Preferably component (1) is a halogenated hydrocarbon and component (2) is a glycol ether. One such solvent dyeing procedure involves wetting, for example, padding, the fibrous material with a dye formulation dissolved or dispersed in the liquid organic mixture of volatile solvents, heating the resulting mixture of dyestuff, solvents and fibrous material thus removing the solvents, which are collected, while simultaneously fixing the dyestuff on the fibrous material by means of heat.

Desirably, the organic solvents are then separated into their components for reuse in the solvent dyeing process. However, these components form azeotrope mixtures which cannot be separated by simple distillation or other conventional separation means. The composition of the azeotrope is not appropriate for re-use. During the solvent dyeing operation, the heating of the textiles to drive off the solvent and fix the dye thereon, also volatilizes water, which is normally present in the textile material in trace amounts. Consequently, the mixture of solvents contains small amounts of water which are cumulative and eventually causes the mixture to separate into two phases. The recovered solvent mixture cannot, therefore, be indefinitely recycled as such to the solvent dyeing process.

It is therefore an object of this invention to provide a process for the recovery of solvents from mixtures thereof used in solvent dyeing procedures.

It is a further object of this invention to provide a process for separating the solvent components used in solvent dyeing procedures whereby the components can be reused in the dyeing operation.

It is a still further object of this invention to provide a simple, economical process for separating the azeotropic solvent mixtures resulting from solvent dyeing procedures.

These and other objects will become apparent from the description given hereinafter.

SUMMARY OF THE INVENTION

Briefly, in accordance with this invention there is provided a process for separating the components of an azeotropic mixture of organic solvents wherein at least one component is water-soluble and at least one component is water-insoluble which comprises adding water to the mixture in an amount sufficient to dissolve and phase separate the water-soluble component, thus forming a non-aqueous, solvent phase and an aqueous, solvent containing phase, separating the non-aqueous phase from the aqueous phase and separating the water from the aqueous phase by distillation in the presence of an entrainer followed by distillation of non-aqueous water soluble solvent.

When operating according to the process of this invention, the solvents in the solvent mixture are efficiently separated resulting in their ability to be recycled to the solvent dyeing process. As a further step in the process of this invention, the entrainer is separated from the water removed from the water-insoluble solvent, and itself recycled to the water removal step.

DETAILED DESCRIPTION OF THE INVENTION

Commercially acceptable dyed fabrics have been obtained from solvent dyeing procedures when the dyestuff is dissolved or dispersed in a volatile organic solvent mixture having a boiling point above about 40° C. and below the softening point of the fibrous material. It is also known to be advantageous to employ as a part of the dye formulation a dyeing adjuvant which may function as a fiber swelling agent, such as an alkylene carbonate. The preferred process of solvent dyeing operates essentially by first padding or otherwise wetting the fibrous material with a controlled amount of dye formulation, and fixing the dyestuff on the fibrous material while the latter is maintained in a zone of hot vapors of the same or different solvent, from about 10 to about 180 seconds. The vapor zone can conveniently be established by various means, such as boiling solvent at the bottom of the zone, employing heated drums or "cans" within the vapor zone over which the fibrous material is passed, or the zone can be supplied with vapors which may be super-heated, from a source external of the zone. The escape of vapors from the vapor zone may be prevented by providing a vapor condensing means which establishes the upper volume limit of the vapors and removes the vapors in excess of that required to fill said zone. These condensed vapors, comprise a mixture of solvents, water, dyeing assistants, etc., in which the mixture of solvents and the water will form an azeotropic mixture, which must be separated in accordance with the process of this invention prior to the reuse of the solvents in the solvent dyeing process.

A further and more detailed description of the solvent dyeing operation may be obtained from U.S. Pat. Nos. 3,510,243 and 3,617,211, which are incorporated herein by reference.

In operation of the processes of this invention the condensed vapors, and/or residual wash liquors, are removed from the vapor condensing zone prior to separation of the components. At this point, the liquid mixture may comprise water insoluble organic solvent, water-soluble organic solvent, water (accumulated from the moisture normally present in the dyed material), traces of dye, dyeing assistants, etc. The azeotrope may be formed from the organic solvents and the water as explained above. The mixture is first separated into two phases by the addition thereto of additional water in an amount sufficient to dissolve the water-soluble component to cause a phase separation. The denser, non-aqueous phase comprises the water-insoluble organic solvent plus some residues (dye assistants, dye, fiber lubricants, sizes, etc.) and is mechanically separated from the less dense aqueous phase. The non-volatiles can easily be removed by distillation of the water-insoluble solvent. At this point the water insoluble solvent is ready for reuse in the solvent dyeing operation.

The aqueous phase comprising the water-soluble solvent and water will also form an azeotrope mixture. An entrainer, e.g. ethylene dichloride, is added to the mixture and heat is applied to bring the mixture to boiling thus causing the water and entrainer to be removed. When distillation of the water and entrainer is complete the water-soluble solvent is recovered by distillation in a state suitable for recycling to the solvent dyeing operation.

The entrainer-water mixture distilled from the solvent may itself be separated into its component parts by mechanical phase separation and the entrainer recycled for reuse in the separation step.

While the amount of water added to the mixture of solvents is stated to be an amount sufficient to dissolve the aqueous component, the use of excess water in this step of the process may be preferable since excess water will result in a reduction in the amount of water-soluble solvent remaining in the water-insoluble solvent. Usually, the amount of water required to substantially separate the water soluble component can be defined as a 1 to 1 ratio of water to water-soluble solvent. However two or even three times this amount can be added depending on the process economics desired and the degree of separation necessary for recycling.

Exemplary water-insoluble solvents suitable for use in solvent dyeing operations in admixture with a water-soluble solvent are, e.g., aromatic hydrocarbons such as toluene or xylene; chlorinated aromatic hydrocarbons such as chloro-benzenes; chlorinated, brominated, fluorinated and mixed halogenated lower aliphatic hydrocarbons having from 1 to 4 carbon atoms, such as methylene methylenechloride, chloroform, dichloromonofluoroethane, 1,1,1 - trifluoropropane, bromodichlorobutane, 1,1,1-trichloroethane, carbon tetrachloride, tetrachloorethylene (perchloroethylene), trichloroethylene and the like. The preferred class of water-insoluble components are the halogenated hydrocarbons containing from 1 to 4 carbon atoms, from 2 to 4 halogen atoms and especially the chlorinated and fluorinated saturated aliphatic and olefinic hydrocarbons containing from 1 to 4 carbon atoms. Generally the water-insoluble components are employed in quantities sufficient to dissolve, disperse or suspend the organic dyestuff, generally at least about 10 and up to about 99 parts, by weight, per part of dyestuff being adequate, although for paler shades, as little as one part of dyestuff per thousand parts of solvent can produce the desired result. In forming the solvent mixture for use in the solvent dyeing operation it is preferable that the water-insoluble component be employed in an amount from about 50 to 95 parts, by weight, based on the total weight of the dye-solvent composition which is usually 1 to 30 parts per part of fiber being dyed, depending on method and apparatus used.

The liquid, water-soluble organic solvent composition of the solvent mixture employed in solvent dyeing operation includes, for example, monovalent low aliphatic alcohols such as methanol, ethanol and n- or isopropanol; alkalene glycol monoalkyl ethers such as ethylene glycol monomethyl, monomethyl (ethoxy ethanol), monopropyl or monobutyl ether; furfuryl alcohol or tetrahydro furfuryl alcohol; divalent aliphatic alcohols such as ethylene glycol or 1,2-propylene glycol; low aliphatic ketones such as acetone; low cyclic ethers such as dioxane; also amides of low fatty acids such as dimethylformamide or dimethylacetamide, and other like solvents.

When the molar ratio of the components in a mixture of boiling liquids is the same in both vapor and liquid phases, the mixture is defined as a constant boiling azeotrope, and the components are not separable by distillation under these conditions. The addition of a third liquid may initiate boiling under different conditions so that one of the original components remains relatively non-volatile while the second component and the additive liquid (called an "entrainer") are distilled off.

In our novel process the formation of an azeotrope of the organic solvents mixture is evaded by separating one as an immiscible non-aqueous phase. The aqueous component however can form an azeotrope with water. The aqueous solvent phase can be separated by addition of an entrainer. Selection of an entrainer will depend on the distillation characteristics of the selected water soluble organic solvent. Assuming for example that water has a lower boiling point than the chosen solvent, then an entrainer with a similar low boiling point will volatilize below the distillation temperature for the solvent and will carry the water vapor with it. If the entrainer in the condenser vapors is substantially water immiscible, it can be continuously returned to the distillation till all water has been removed. Entrainers are known to the art and the selection of specific entrainers to accomplish the desired separation will be dependent upon the desired result and mode of operation. Generally, entrainers are water immiscible organic liquids having a boiling point below 100° C. Examples of entrainers which may be employed in the separation are chlorinated hydrocarbons, such as, ethylene dichloride and certain aromatic hydrocarbons such as benzene and the like.

DESCRIPTION OF PREFERRED EMBODIMENTS

It will be understood that the following examples are given by way of illustration only and are not to be considered limiting in any manner. Parts are by weight unless indicated otherwise.

EXAMPLE I 40 parts of unscoured acrylic fabric are wound on a beam, and the beam is placed in a suitable dyeing apparatus. A solvent bath is prepared from 580 parts perchloroethylene, 37 parts ethylene glycol monoethyl ether and 4.4 parts of ethylene carbonate. 0.4 part of a cationic dye are placed in a cotton sack which in turn is placed in the liquid solvent circulation system so that the solvent flows through the sack during its circulation to the fabric.

The solvent bath is heated to 100° C. over a period of ½ hour and held at this temperature for an additional ½ hour. During the heating the solvent is circulated through the apparatus into contact with the fabric. After one hour the heating is stopped and the solvent is drained. The fabric is then washed with a mixture of perchloroethylene and ethylene glycol monoethyl ether in the same ratio as given above. The dyed fabric has excellent levelness and asthetic properties.

The solvent bath and the wash liquors are removed and a portion thereof comprising 935 parts perchloroethylene, 60 parts of ethylene glycol monoethyl ether and 5 parts of oil, lubricants, traces of water, etc., is mixed well with 100 parts of water resulting in immediate phase separation. The aqueous and non-aqueous phases are separated mechanically and the perchloroethylene is thereafter distilled and recovered in a substantially pure form for recycling to the solvent dyeing operation.

The aqueous phase containing the water-soluble ethylene glycol monoethyl ether is transferred to a still equipped with a continuous phase separator in the condensate return line. About 10 parts of ethylene dichloride is added to the aqueous phase and distillation is begun. Water and ethyldichloride are distilled from the mixture at a vapor temperature up to about 100–105° C. The distillate is condensed and run through a receiver where the ethylene dichloride is separated and returned to the still. When the vapor temperature reaches about 120° C. the remainder of the distillate is ethylene glycol monoethyl ether. The ethylene dichloride addition is terminated and the glycol ether is collected and returned to the solvent dyeing operation.

EXAMPLE II

To a solvent mixture composed of 270 parts of perchloroethylene, 30 parts of ethoxy ethanol, a trace amount of dyeing assistant and a trace amount of water, there was added 30 parts of water with agitation. A phase separation occurred with the denser perchloroethylene fraction, consisting of 277 parts of perchloroethylene containing a small amount of ethoxyethanol forming a distinct phase. The perchloroethylene was separated from the aqueous phase mechanically. The perchloroethylene was then distilled to free it of nonvolatile components and in this state it was ready for use in solvent dyeing operations.

The aqueous phase was placed in a still with about 10 parts of ethylene dichloride and distillation was started. Water and ethylene chloride were removed, condensed and passed to another phase separator wherein the ethylene chloride was separated and returned to the still. When the distillation of water was complete (30 parts of water were recovered), the return of the ethylene chloride was stopped and held for subsequent reuse. The still temperature was then raised to distill and recover the ethoxyethanol (26 parts) which is ready for use in solvent dyeing.

What is claimed is:

1. In a process for dyeing textile materials wherein a solution comprising a short chain alkylene glycol monoalkyl ether, a chlorinated hydrocarbon and a dyestuff are applied to a textile material and thereafter heated to volatilize the ether and the chlorinated hydrocarbon and to fix the dyestuff onto the textile, and wherein the volatilized ether and chlorinated hydrocarbon are collected and condensed to form an azeotrope-forming mixture, the improvement which comprises separating the ether from the chlorinated hydrocarbon by adding water to the mixture in an amount sufficient to dissolve the ether and cause formation of (a) a water insoluble phase comprising the halogenated hydrocarbon and (b) an aqueous phase containing the ether, recycling the chlorinated hydrocarbon to the dyeing process, adding dichloroethylene to the aqueous phase, distilling the aqueous phase to remove water and dichloroethylene, and thereafter recycling the ether to the dyeing process.

2. A process according to claim 1 wherein the chlorinated hydrocarbon is perchloroethylene.

3. A process according to claim 1 wherein the short chain alkylene glycol monoalkyl ether is ethoxyethanol.

4. A process according to claim 2 wherein the short chain alkylene glycol monoalkyl ether is ethoxyethanol.

5. A process according to claim 1 wherein the condensed mixture obtained from the dyeing process contains water which was present on the textile material prior to the heating step.

6. A process according to claim 1 wherein the entrainer is separated from the removed water and recycled to the distillation step.

References Cited

UNITED STATES PATENTS

| 2,212,810 | 8/1940 | Field | 203—44 |
|---|---|---|---|
| 2,050,513 | 8/1936 | Von Peski et al. | 203—44 |
| 2,649,406 | 8/1953 | Harrison et al. | 203—45 |
| 3,449,218 | 6/1969 | Jaeger | 203—46 |
| 3,476,798 | 11/1969 | Kunstle et al. | 203—44 |
| 3,667,898 | 6/1972 | Bergman | 8—174 |
| 2,184,559 | 12/1939 | Mellor et al. | 8—174 |
| 3,473,175 | 10/1969 | Sieber | 8—158 |
| 3,523,749 | 8/1970 | MacLeod | 8—54.2 |
| 3,510,243 | 5/1970 | Seuret | 8—39 |

OTHER REFERENCES

White, American Dyestuff Reporter, July 31, 1967, pp. 18–24. TP890A512.

Milicevic, Textile Chemist and Colorest, vol. 2, No. 5, 1970, pp. 87–98.

DONALD LEVY, Primary Examiner

U.S. Cl. X.R.

8—174, 94, 93, 81

UNITED STATES PATENT OFFICE
CERTIFICATE OF CORRECTION

Patent No. U.S.P. 3,809,536           Dated May 7, 1974

Inventor(s) Frederick L. Sievenpiper & Elmore L. Bement

It is certified that error appears in the above-identified patent and that said Letters Patent are hereby corrected as shown below:

Col. 3, line 50 - "tetrachloorethylene" should read
-- tetrachloroethylene --;

Col. 5, line 15 - after "ethanol," insert -- a trace amount of dye, --;

Col. 6, line 7 - "dichloroethylene" should read
-- ethylene dichloride --;

Col. 6, after claim 6 insert

-- 7. A process according to claim 5 wherein the water insoluble solvent is perchloroethylene. --

Signed and sealed this 19th day of November 1974.

(SEAL)
Attest:

McCOY M. GIBSON JR.
Attesting Officer

C. MARSHALL DANN
Commissioner of Patents